United States Patent [19]

Van de Moere

[11] Patent Number: 4,882,600

[45] Date of Patent: Nov. 21, 1989

[54] UNDERWATER DISPOSABLE SINGLE-USE CAMERA

[75] Inventor: Alan V. Van de Moere, Rochester, N.Y.

[73] Assignee: Eastman Kodak Company, Rochester, N.Y.

[21] Appl. No.: 334,403

[22] Filed: Apr. 7, 1989

[51] Int. Cl.⁴ .............................................. G03B 17/08
[52] U.S. Cl. ..................................... 354/64; 354/219; 354/288
[58] Field of Search .................. 354/64, 202, 219, 288

[56] References Cited

U.S. PATENT DOCUMENTS

| | | | |
|---|---|---|---|
| 3,412,661 | 11/1968 | Soumar | 354/64 |
| 4,714,333 | 12/1987 | Tamamura et al. | 354/64 |
| 4,766,451 | 8/1988 | Fujimura et al. | 354/64 |
| 4,801,957 | 1/1989 | Van de moere | 354/288 |
| 4,804,987 | 2/1989 | Arai | 354/288 |
| 4,811,039 | 3/1989 | Maeno et al. | 354/64 |

Primary Examiner—A. A. Mathews
Attorney, Agent, or Firm—Roger A. Fields

[57] ABSTRACT

A disposable single-use camera is generally of the type wherein a plastic inner camera shell is pre-loaded with film and has front and rear viewfinder openings for viewing a subject to be photographed and a paper outer pack tightly contains the inner shell and has front and rear openings aligned with the respective viewfinder openings. According to the invention, a plastic transparent waterproof casing encloses the outer pack and the inner shell. The transparent casing includes integrally formed front and rear viewfinder lens elments which are optically aligned with the front and rear openings in the outer pack and the front and rear viewfinder openings in the inner shell.

5 Claims, 4 Drawing Sheets

UNDERWATER DISPOSABLE SINGLE-USE CAMERA

BACKGROUND OF THE INVENTION

1. Field of the Invention

The invention relates generally to the field of photography, and more particularly to a disposable single-use camera.

2. Description of the Prior Art

Recently, a disposable single-use 35mm camera referred to as the "Quick Snap" was introduced by Fuji Photo Film Co. Ltd, and another disposable single-use 35 mm camera referred to as the "Fling 35" was introduced by Eastman Kodak Co. Generally, each disposable camera is a point-and-shoot type and comprises (1) a plastic inner camera shell including a taking lens, a film metering mechanism, and a simple shutter and (2) a paper-cardboard outer sealed pack which contains the inner camera shell and has respective openings for the taking lens and for a shutter release button, a frame counter window, and a film advance thumbwheel on the camera shell. The inner camera shell has front and rear viewfinder windows located at opposite ends of a see-through viewfinder tunnel, and the outer sealed pack has front and rear openings for the respective viewfinder windows. At the manufacturer, the inner camera shell is loaded with a conventional 24-exposure 35 mm film cartridge, and substantially the entire length of the unexposed filmstrip is factory prewound from the cartridge into a supply chamber of the camera shell. After the customer takes a picture, the thumbwheel is manually rotated to rewind the exposed frame into the cartridge. The rewinding movement of the filmstrip the equivalent of one frame rotates a metering sprocket to decrement a frame counter to its next lower numbered setting. When substantially the entire length of the filmstrip is exposed and rewound into the cartridge, the single-use camera is sent to a photofinisher who first removes the inner camera shell from the outer sealed pack and then removes the filmstrip from the camera shell. The filmstrip is processed, and the camera shell and the opened pack are thrown away.

While neither of these disposable cameras is adapted for underwater use, their modification for such purpose would be of interest to the consumer. Typically, an underwater camera comprises a standard camera enclosed in some form of waterproof housing, with the manual controls operating through water-tight seals such as "O" rings or continuous flat rubber gaskets. The camera viewfinder is aligned with glass windows in the waterproof housing, or alternatively a gun-sight viewfinder is mounted atop the waterproof housing.

SUMMARY OF THE INVENTION

According to the invention, there has been devised an improved disposable single-use camera wherein (a) a plastic inner camera shell is pre-loaded with film and has a front viewfinder opening arranged in a front wall of the inner shell and a rear viewfinder opening arranged in a rear wall of the inner shell for viewing the subject to be photographed through the front and rear viewfinder openings and (b) a paper outer pack contains the inner shell and has a front opening arranged in a front wall of the outer pack and a rear opening arranged in a rear wall of the outer pack to be substantially aligned with the respective viewfinder openings in the inner shell, and wherein the improvement comprises:

a plastic transparent water-resistant casing enclosing the outer pack and the inner shell said transparent casing including a front plastic viewfinder lens element arranged on a front wall of the casing to be optically aligned with the front opening in the outer pack and the front viewfinder opening in the inner shell and a rear plastic viewfinder lens element arranged on a rear wall of the casing to be optically aligned with the rear opening in the outer pack and the rear viewfinder opening in the inner shell.

Preferably, the front viewfinder lens element is integrally formed with the front wall of the transparent casing, and the rear viewfinder lens element is integrally formed with the rear wall of the transparent casing.

DETAILED DESCRIPTION OF THE PREFERRED EMBODIMENT

Figure 1:
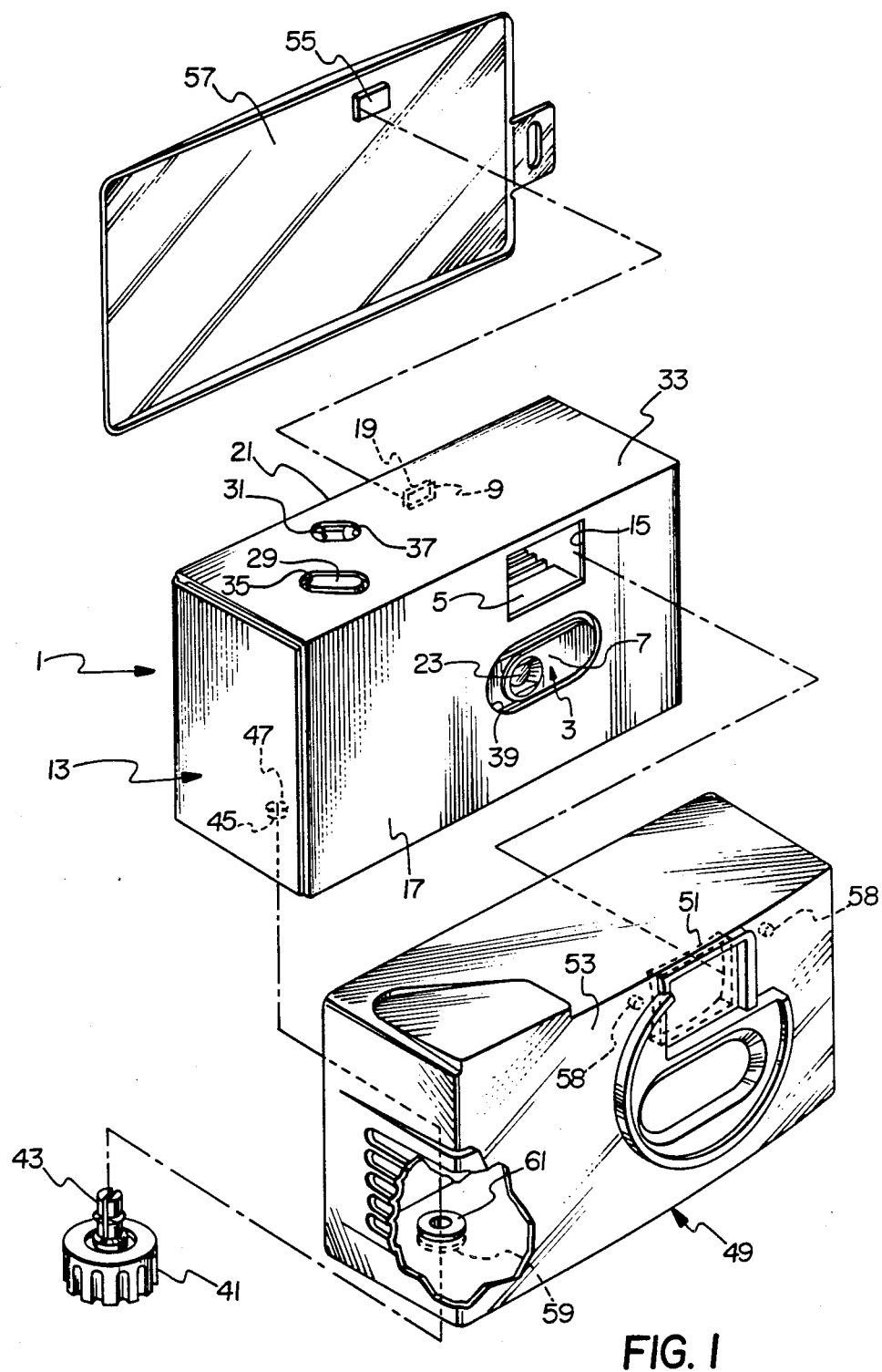
FIG. 1 is a front exploded perspective view of an underwater disposable single-use 35 mm camera according to a preferred embodiment of the invention, showing the disposable camera and a waterproof casing.

The invention is disclosed in connection with a 35 mm camera. Because such a camera is widely known, this description is directed in particular to photographic elements forming part of or cooperating directly with the invention. It is to be understood, however, that other elements not specifically shown or described may take various forms known to persons of ordinary skill in the art.

Referring now to the drawings, FIGS. 1–4 depict a disposable single-use 35 mm camera 1. The disposable camera 1 is a point-and-shoot type and comprises (a) an inner camera shell 3 having a front viewfinder opening 5 arranged in a front wall 7 of the inner shell and a rear viewfinder opening 9 arranged in a rear wall 11 of the inner shell for viewing a subject to be photographed through the two viewfinder openings and (b) an outer sealed pack 13 which tightly contains the inner shell and has a front opening 15 arranged in a front wall 17 of the outer pack and a rear opening 19 arranged in a rear wall 21 of the outer pack to be substantially aligned with the respective viewfinder openings in the inner shell. The inner camera shell 3 houses a taking lens 23, a single blade shutter (not shown), a film advance and metering mechanism (not shown), and a frame counter (not shown). A top wall 25 of the inner camera shell 3 has a top opening 27 for a manually depressible shutter release button 29 and a top window 31 for the frame counter. A top wall 33 of the outer sealed pack 13 has respective top openings 35 and 37 for the release button 29 and the top window 31 for the frame counter. The front wall 17 of the outer sealed pack 13 has a front opening 39 for the taking lens 23. A manually rotatable thumbwheel 41 is coupled to the film advance and metering mechanism via a stem 43 which extends through respective bottom openings 45 and 47 in the outer sealed pack 13 and the inner camera shell 3.

At the manufacturer, the inner camera shell 3 is loaded with a conventional 24-exposure 35 mm film cartridge and substantially the entire length of the unexposed filmstrip is factory prewound from the cartridge onto a take-up spool (not shown) in the camera shell. After the customer takes a picture by depressing the release button 29, the thumbwheel 41 is manually rotated to rewind the exposed frame into the cartridge. The rewinding movement of the filmstrip the equivalent of one frame rotates a metering sprocket (not shown) to decrement the frame counter to its next lower numbered setting. When substantially the entire length of the filmstrip is exposed and rewound into the cartridge, the single-use camera 1 is sent to a photofinisher who first removes the inner camera shell 3 from the outer sealed pack 13 and then removes the filmstrip from the camera shell. The filmstrip is processed, and the camera shell 3 and the opened pack 13 are thrown away.

Figure 3:
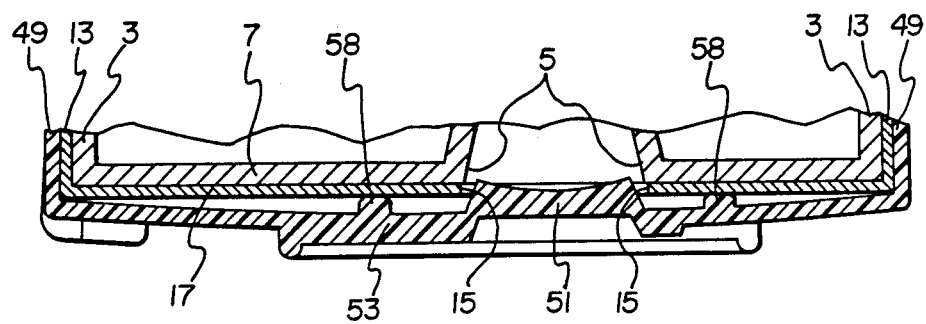
FIG. 3 is a sectional view of the respective front walls of the waterproof casing, the outer sealed pack, and the inner camera shell, particularly with respect to a tunnel-like viewfinder.
Figure 4:
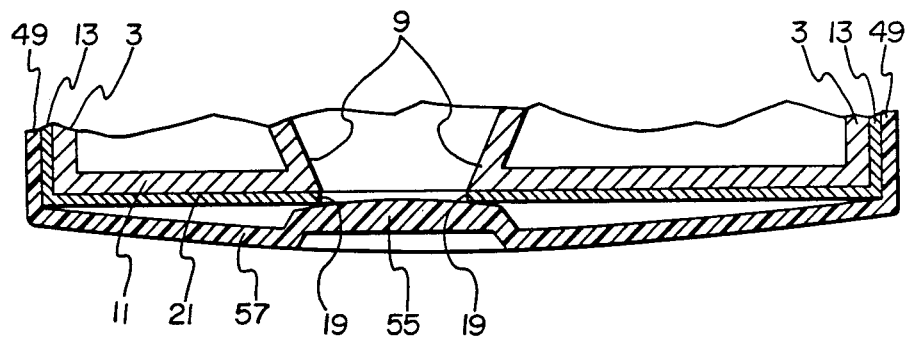
FIG. 4 is a sectional view similar to FIG. 3, but at the respective rear walls of the waterproof casing, the outer sealed pack, and the inner camera shell.

According to the invention, a plastic transparent waterproof casing 49 tightly encloses the outer sealed pack 13 and the inner camera shell 3. See FIG. 1. The waterproof casing 49 includes a front plastic viewfinder lens 51 integrally formed on a front wall 53 of the casing to be optically aligned with the front opening 15 in the outer pack 13 and the front viewfinder opening 5 in the inner shell 3 as shown in FIG. 3, and it includes a rear plastic viewfinder lens 55 integrally formed on a rear wall 57 of the casing to be optically aligned with the rear opening 19 in the outer pack and the rear viewfinder opening 9 in the inner shell as shown in FIG. 4. The front viewfinder lens element 51 extends through the front opening 15 in the outer pack 13 and slightly into the front viewfinder opening 5 in the inner shell 3. See FIG. 3. A pair of spacers 58 are integrally formed on the front wall 53 of the waterproof casing 49 to abut the front wall 17 of the outer pack 13, to limit the extent to which the front viewfinder lens element 51 extends into the front viewfinder opening 5 of the inner shell 3. The rear wall 57 of the waterproof casing 49 is outwardly bowed as shown in FIG. 4 to urge the rear viewfinder lens element 55 firmly against the rear wall 21 of the outer pack 13, to position the rear viewfinder lens element to cover the rear opening 19 in the outer pack.

Figure 2:
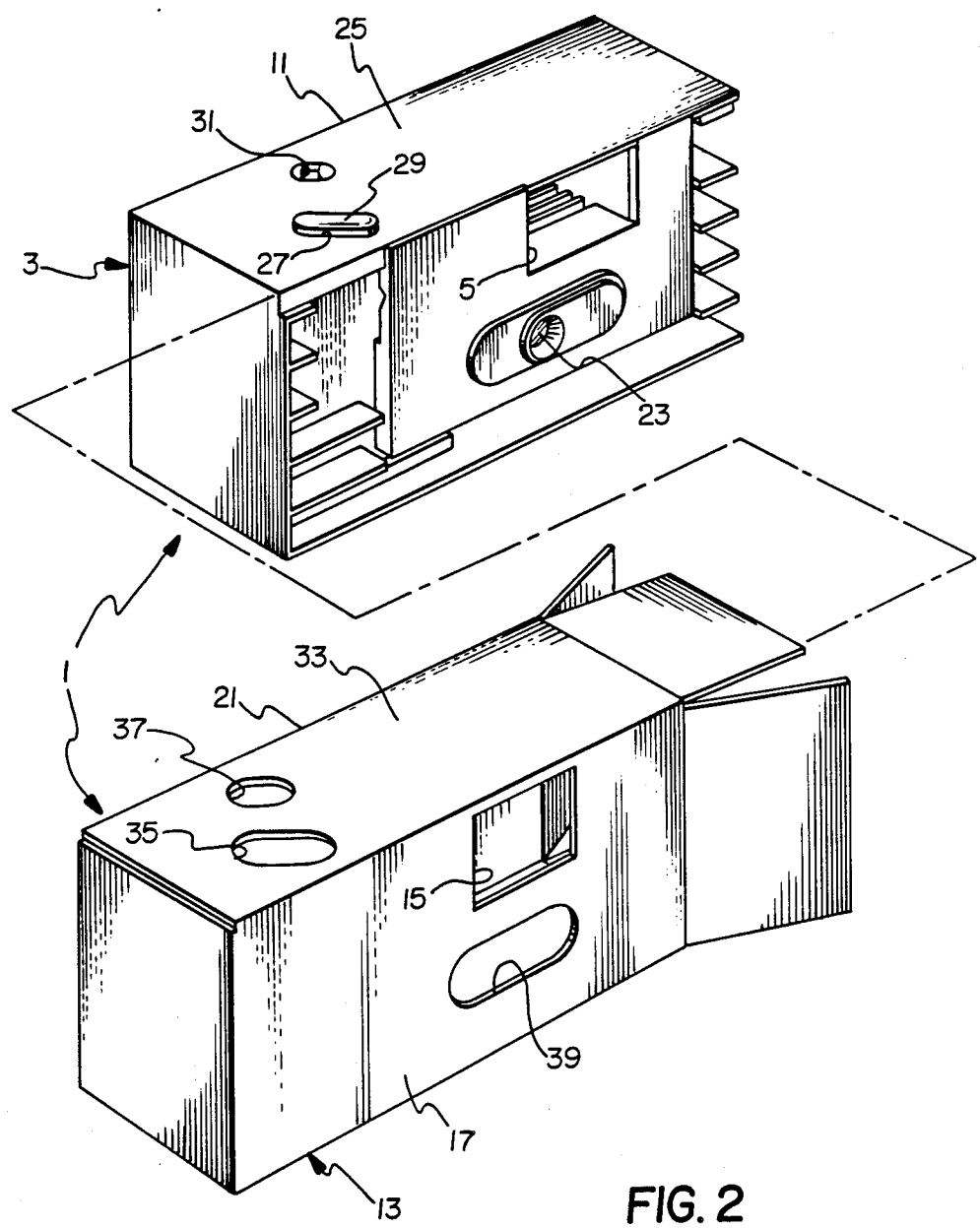
FIG. 2 is a front perspective view only of the disposable camera, showing a plastic inner camera shell and a paper outer sealed pack.

The waterproof casing 49 may be injection molded in two pieces as shown in FIG. 2. The two pieces would then be sealed together in a watertight relation with the disposable camera 1 enclosed between them. Since the front and rear viewfinder lens elements 51 and 55 may be made of the same material as the waterproof casing, it is a simple matter to injection mold the lens elements with the casing.

A bottom opening 59 is provided in the waterproof casing 49 to admit the stem 43 of the thumbwheel 41 into the respective bottom openings 45 and 47 in the outer sealed pack 13 and the inner camera shell 3. See FIG. 1. A flat rubber gasket 61 is sandwiched between the bottom opening 59 and the bottom opening 45 to prevent water from entering the casing 49 along the stem 43 of the thumbwheel 41.

Figure 5:
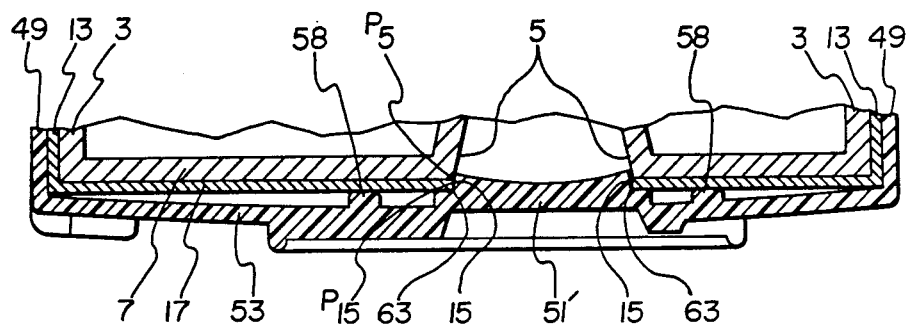
FIG. 5 is a sectional view similar to FIG. 3, but of an alternate embodiment of the invention.
Figure 6:
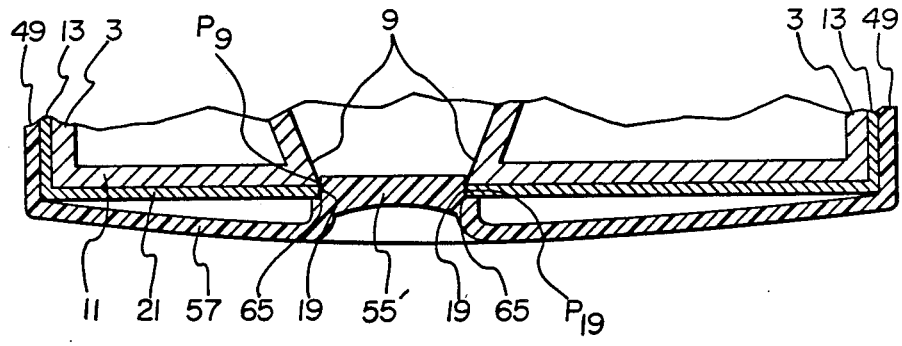
FIG. 6 is a sectional view similar to FIG. 4, of the alternate embodiment.

Alternate Embodiment

Where FIGS. 5 and 6 are similar to FIGS. 3 and 4, respectively, the same reference numbers are used. Where the two pairs of FIGS. differ somewhat, the reference numbers in FIGS. 5 and 6 are followed by a prime ("'") designation. Thus, in FIG. 5 the front viewfinder lens element is 51' and in FIG. 6 the rear viewfinder lens element is 55'.

In FIG. 5, the front viewfinder lens element 51' includes a continuous registration notch 63 for engaging the outer sealed pack 13 at the perimeter $P_{15}$ of the front opening 15 in the outer pack and for engaging the inner camera shell 3 at the perimeter $P_5$ of the front viewfinder opening 5 in the inner shell. Similarly in FIG. 6, the rear viewfinder lens element 55' includes a continuous registration notch 65 for engaging the outer pack 13 at the perimeter $P_{19}$ of the rear opening 19 in the outer pack and for engaging the inner shell 3 at the perimeter $P_9$ of the rear viewfinder opening 9 in the inner shell.

The invention has been described with reference to a preferred embodiment. However, it will be appreciated that variations and modifications can be effected within the ordinary skill in the art without departing from the scope of the invention.

I claim:

1. An improved disposable single-use camera wherein (a) a plastic inner camera shell is pre-loaded with film and has a front viewfinder opening arranged in a front wall of said inner shell and a rear viewfinder opening arranged in a rear wall of the inner shell for viewing a subject to be photographed through said front and rear viewfinder openings and (b) a paper outer pack contains the inner shell and has a front opening arranged in a front wall of said outer pack and a rear opening arranged in a rear wall of the outer pack to be substantially aligned with the respective viewfinder openings in said inner shell, and wherein the improvement comprises:

a plastic transparent waterproof casing enclosing said outer pack and said inner shell, said transparent casing including a front plastic viewfinder lens element arranged on a front wall of the casing to be optically aligned with said front opening in the outer pack and said front viewfinder opening in the inner shell and a rear plastic viewfinder lens element arranged on a rear wall of said casing to be optically aligned with said rear opening in the outer pack and said rear viewfinder opening in the inner shell.

2. The improvement as recited in claim 1, wherein said front viewfinder lens element is integrally formed with said front wall of the transparent casing and said rear viewfinder lens element is integrally formed with said rear wall of the transparent casing.

3. The improvement as recited in claim 1, wherein at least one of said front and rear viewfinder lens elements extends through a corresponding one of the front and rear openings in said outer pack and slightly into a corresponding one of the front and rear viewfinder openings in said inner shell.

4. The improvement as recited in claim 1, wherein at least one of said front and rear walls of the transparent casing is outwardly bowed to urge a corresponding one of said front and rear viewfinder lens elements against a corresponding one of said front and rear walls of the outer pack to position the front or rear lens element to cover a corresponding one of said front and rear openings in the outer pack.

5. The improvement as recited in claim 1, wherein at least one of said front and rear viewfinder lens elements includes integral registration means engaging said outer pack at the perimeter of a corresponding one of its front and rear openings and engaging said inner shell at the perimeter of a corresponding one of its front and rear viewfinder openings.

* * * * *